(12) United States Patent
Keeni

(10) Patent No.: US 9,497,031 B2
(45) Date of Patent: Nov. 15, 2016

(54) METHOD FOR BUILDING GREEN NETWORK

(71) Applicant: CYBER SOLUTIONS INC., Miyagi (JP)

(72) Inventor: Glenn Mansfield Keeni, Miyagi (JP)

(73) Assignee: CYBER SOLUTIONS INC., Miyagi (JP)

(*) Notice: Subject to any disclaimer, the term of this patent is extended or adjusted under 35 U.S.C. 154(b) by 6 days.

(21) Appl. No.: 14/421,161

(22) PCT Filed: Mar. 3, 2014

(86) PCT No.: PCT/JP2014/055251
§ 371 (c)(1),
(2) Date: Feb. 12, 2015

(87) PCT Pub. No.: WO2014/156485
PCT Pub. Date: Oct. 2, 2014

(65) Prior Publication Data
US 2015/0207634 A1 Jul. 23, 2015

(30) Foreign Application Priority Data

Mar. 29, 2013 (JP) ................................. 2013-074675

(51) Int. Cl.
| H04L 12/12 | (2006.01) |
| H04L 12/46 | (2006.01) |
| H04L 12/24 | (2006.01) |
| H04L 12/721 | (2013.01) |
| H04L 12/931 | (2013.01) |
| H04L 12/935 | (2013.01) |

(52) U.S. Cl.
CPC ............. *H04L 12/12* (2013.01); *H04L 12/462* (2013.01); *H04L 41/22* (2013.01); *H04L 45/66* (2013.01); *H04L 45/70* (2013.01); *H04L 49/3009* (2013.01); *H04L 49/35* (2013.01); *Y02B 60/34* (2013.01); *Y02B 60/35* (2013.01)

(58) Field of Classification Search
CPC ...... H04L 12/12; H04L 12/46; H04L 12/462
See application file for complete search history.

(56) References Cited

FOREIGN PATENT DOCUMENTS

| JP | 2010-148023 | 7/2010 |
| JP | 2011-044842 | 3/2011 |

OTHER PUBLICATIONS

International Search Report—PCT/JP2014/055251—Apr. 8, 2014.

*Primary Examiner* — Feben M Haile
(74) *Attorney, Agent, or Firm* — Young & Thompson

(57) ABSTRACT

Provided is a technique for building a green architecture for achieving efficient power saving in a Layer-2 network, the technique having: a packet collection process (S01) for collecting all broadcast packets communicated within the network and extracting packet information; a MAC-IP history generation process (S02) for generating MIPT with the latest timestamp from the packet information; an access analysis process (S03) for counting, on the basis of information about the MIPT, the number of packets per category of {SMAC, DMAC} in each time slot having a certain interval, and generating a MAcT; an L2 switch port analysis process (S04) for generating an MDMAcT on the basis of information about the MAcT; a green architecture building process (S05) for generating a GMDMAcT in which a port connection configuration of the MDMAcT has been updated; and a visualization process (S06) for displaying information about the GMDMAcT.

5 Claims, 4 Drawing Sheets

Packet Information Table

| TStamp | SMAC | SIP | DIP |
|---|---|---|---|
| 10:00:00 | MAC-N31 | IP-N31 | IP-H1 |
| 10:00:10 | MAC-H1 | IP-H1 | IP-N31 |
| 10:01:30 | MAC-N22 | IP-N22 | IP-H2 |
| 10:01:40 | MAC-H2 | IP-H2 | IP-N22 |
| 10:03:00 | MAC-N31 | IP-N31-1 | IP-H1 |
| 10:03:10 | MAC-H1 | IP-H1 | IP-N31-1 |
| 10:04:40 | MAC-N11 | IP-N11 | IP-H2 |
| 10:04:50 | MAC-H2 | IP-H2 | IP-N11 |
| 10:06:00 | MAC-N31 | IP-N31-1 | IP-H1 |
| 10:06:10 | MAC-H1 | IP-H1 | IP-N31-1 |
| 10:09:00 | MAC-N31 | IP-N31 | IP-H1 |
| 10:09:10 | MAC-H1 | IP-H1 | IP-N31 |
| ⋮ | ⋮ | ⋮ | ⋮ |

MIPT

| MAC | IP | LastTimeStamp |
|---|---|---|
| MAC-N31 | IP-N31 | 10:00:00 |
| MAC-H1 | IP-H1 | 10:09:10 |
| MAC-N22 | IP-N22 | 10:01:30 |
| MAC-H2 | IP-H2 | 10:04:50 |
| MAC-N31 | IP-N31-1 | 10:06:00 |
| MAC-N11 | IP-N11 | 10:04:40 |
| MAC-N31 | IP-N31 | 10:09:00 |

MAcT

| TimePeriod | SMAC | DMAC | Count |
|---|---|---|---|
| 10:00:00 ~ 10:09:59 | MAC-N31 | MAC-H1 | 8 |
|  | MAC-N22 | MAC-H2 | 2 |
|  | MAC-N11 | MAC-H2 | 2 |
| 10:10:00 ~ 10:19:59 | ⋮ | ⋮ | ⋮ |

Figure 4

MDMAcT according to L2 Swich S3 (Port Count: 8)

| HourlyPeriod | Switch Port | DMAC | Count |
|---|---|---|---|
| 21:00:00 | 1 | nil | 0 |
| ~ | 2 | MAC-N31 | 0 |
| 21:59:59 | 3 | MAC-N32 | 0 |
| | 4 | MAC-N33 | 6 |
| | 5 | nil | 0 |
| | 6 | nil | 0 |
| | 7 | nil | 0 |
| | 8 | nil | 0 |

MDMAcT according to L2 Swich S2 (Port Count: 8)

| HourlyPeriod | Switch Port | DMAC | Count |
|---|---|---|---|
| 21:00:00 | 1 | nil | 0 |
| ~ | 2 | nil | 0 |
| 21:59:59 | 3 | MAC-H2 | 16 |
| | 4 | MAC-N21 | 10 |
| | 5 | MAC-N22 | 4 |
| | 6 | nil | 0 |
| | 7 | nil | 0 |
| | 8 | nil | 0 |

GMDMAcT according to L2 Swich S3 (Port Count: 8)

| HourlyPeriod | Switch Port | DMAC | Count |
|---|---|---|---|
| 21:00:00 | 1 | nil | 0 |
| ~ | 2 | MAC-N31 | 0 |
| 21:59:59 | 3 | MAC-N32 | 0 |
| | 4 | nil | 0 |
| | 5 | nil | 0 |
| | 6 | nil | 0 |
| | 7 | nil | 0 |
| | 8 | nil | 0 |

Deleting MAC-N33

GMDMAcT according to L2 Swich S2 (Port Count: 8)

| HourlyPeriod | Switch Port | DMAC | Count |
|---|---|---|---|
| 21:00:00 | 1 | MAC-N33 | 6 |
| ~ | 2 | nil | 0 |
| 21:59:59 | 3 | MAC-H2 | 16 |
| | 4 | MAC-N21 | 10 |
| | 5 | MAC-N22 | 4 |
| | 6 | nil | 0 |
| | 7 | nil | 0 |
| | 8 | nil | 0 |

Adding MAC-N33

Figure 5

MDMAcT of L2 Switch

| HourlyPeriod | Switch Port | DMAC | Count |
|---|---|---|---|

Hourly Period: 00:00:00-00:59:59
                01:00:00-01:59:59
Switch Port: 1, 2, ···, n
DMAC is connected DMACoff = DMACs for which Count eq 0 for the hour
DMACon = DMACs for which Count ne 0 for the hour
DMACoffC = Number of DMACOffs in the switch for the hour
DMAConC = Number of DMACOns in the switch for the hour
FreePortCount-Sn = Number of free ports in the switch (Sn)

*Process HDMAcT to generate a new GHDMAcT*
```
a. for h (0..23)
b1. sort the switches {Si} by descending DMACoffC + FreePortCount-Si
b2-1. for Si (I:1..N)
b2-2     goto to b2-1 if DMAConC = 0;
b2-3     for DMACon-p (p:1.. DMAConC)
b2-4         for Sj (j:1..N; j ne i)
b2-5             goto b2-4 if no free ports in Sj
b2-5             if DMACoffC-Si < DMACoffC-Sj
                     mv DMACon-p from Si to Sj
                     FreePortCount-Sj -- ; FreePortCount-Si ++;
                 else goto b2-4
b2-6         goto b2-3
b2-7     goto b2-1
```

METHOD FOR BUILDING GREEN NETWORK

TECHNICAL FIELD

The present invention relates to a method for constructing a green network, from an arbitrary network comprising of Layer-2 switches (L2 switches), wherein the newly constructed green architecture allows efficient power saving.

BACKGROUND TECHNOLOGY

Recently, with increasing network utilization in office and school, there has been a lot of progress in technology development for achieving efficient power saving by automatic switching off of unused apparatuses.

For instance, "Patent document 1" discloses a method for achieving efficient power saving, wherein servers with lumped load are placed in a predetermined rack, and power supply of the rack is stopped when all the servers of the rack have no load.

"Patent document 2" discloses a method for achieving efficient power saving by controlling power-supply of routers and switches configured as redundancy part in a network.

[Patent document 1] Japanese Patent Laid-Open No. 2011-082799

[Patent document 2] Japanese Patent Laid-Open No. 2012-244440

DISCLOSURE OF THE INVENTION

Problem to be Solved by the Invention

One of the most successful methods to achieve efficient power saving is the method for monitoring usage of all apparatuses (for instance, L2 switches) in a network, and controlling power-supply of the apparatuses according to usage.

For instance, efficient power saving is achieved by stopping power-supply of L2 switches for the period when the L2 switches are not in use.

The present invention proposes a method for constructing a green architecture for achieving efficient power saving in an arbitrary network comprising of L2 switches.

Means to Solve the Problem

To achieve the purpose mentioned above, there is disclosed a method for constructing a green network intended to construct a green architecture for achieving efficient power saving in an arbitrary network comprising of L2 switches, comprising of:

a packet collection process for collecting all broadcast packets transmitted within the network and extracting packet information {Time Stamp(TStamp), Source MAC Address (SMAC), Source IP Address(SIP), Destination IP Address (DIP)} from the broadcast packets;

a MAC-IP history generation process for generating a MAC-IP history table (MIPT) with entries {MACAddress (MAC), IP Address(IP), Latest Timestamp(LastTimeStamp)} based on the packet information {TStamp, SMAC, SIP, DIP} extracted by the packet collection process;

an access analysis process for generating an access history table (MAcT) with entries {Time Period (TimePeriod), Source MAC Address (SMAC), Destination MAC Address (DMAC), Access Count (Count)}, by classifying packets into categories{Source MAC Address(SMAC), Destination MAC Address(DMAC)} based on MIPT generated by the MAC-IP history generation process and counting the number of packets classified into the categories within the predetermined time slot at regular intervals based on the packet information {TStamp, SMAC, SIP, DIP} extracted by the packet collection process;

a L2 switch port analysis process for generating a L2 switch state table (MDMAcT) with entries {Period(HourlyPeriod), L2 switch port (port), Destination MAC Address (DMAC), Access Count (Count)} for every L2 switch, by detecting apparatuses connected to the port of L2 switches and analyzing access counts of the apparatuses within predetermined period based on the MAcT generated by the access analysis process; and a green architecture construction process for generating a green L2 switch state table (GMDMAcT) in which L2 switch port configuration of the MDMAcT is updated, upon detecting a specific L2 switch in which the L2 switch port is in access state (1=<Count) based on the MDMAcT, deleting the entry DMAC of the L2 switch port of the L2 switch detected above from the MDMAcT, and adding the entry DMAC to the MDMAcT of other L2 switch.

In a further refinement, the green architecture construction process comprises the steps of:

(1) Detecting a L2 switch including the least number of the L2 switch port that is in access state (1=<Count) from L2 switches in which the L2 switch port is in access state (1=<Count) based on the MDMAcT;

(2) Deleting the entry DMAC of the port of the L2 switch detected above from the MDMAcT, and adding the entry DMAC to the empty entry of the MDMAcT of other L2 switch;

(3) Generating the GMDMAcT in which L2 switch port configuration of the MDMAcT has been updated upon executing the above steps (1) and (2) repeatedly.

Another embodiment includes a visualization process for displaying information about the GMDMAcT in which L2 switch port configuration of the MDMAcT has been updated.

In yet another embodiment, the visualization process further comprises:

analyzing communication time between specific apparatuses based on the MAcT, and displaying information about the L2 switch to which the apparatuses are connected in case the communication time has been beyond the predetermined threshold.

Effect of the Invention

The invention as disclosed is able to currently detect the communication state of L2 switch ports (for instance, communication frequency of apparatuses connected to L2 switch ports) within a predetermined time and generate the green L2 switch state table (GMDMAcT) in which L2 switch port configuration of the MDMAcT has been updated for achieving efficient power saving in the network including Layer-2 switches. More specifically, the invention has the effect of being able to construct a green architecture for achieving efficient power saving in the arbitrary network comprising of L2 switches.

The invention also has the effect of being able to carry out dynamic generation of the green L2 switch state table (GMDMAcT) in which L2 switch port configuration of the MDMAcT has been updated for achieving efficient power saving in the arbitrary network comprising of L2 switches.

The invention additionally has the effect of enabling the network administrator to carry out dynamic alterations of L2 switch port configuration with reference to the GMDMAcT. More specifically, the invention has the effect of being able to stop power-supply of the L2 switches for the period when the L2 switches are not used (the L2 switch ports have no access). Herewith, the invention has the effect of achieving efficient power saving by cutting ineffectual power.

The invention furthermore has the effect of being able to carry out detecting currently the communication with the apparatuses over prolonged period of time with reference to information about the different L2 switches to which the apparatuses are connected in case the communication time is beyond the predetermined threshold. Herewith, the invention has the effect of enabling the network administrator to alter L2 switch port configuration to connect the apparatuses to the same L2 switch.

BRIEF DESCRIPTION OF DRAWINGS

FIG. 4 shows an example of state tables about L2 switches for carrying out "Execution Example 1" of the present invention.

FIG. 5 shows an example of algorism executed for carrying out "Execution Example 1" of the present invention.

EXPLANATION OF CODES USED IN THE DIAGRAMS

M1 Manager
S1-S2 Layer-2 switch
N11-N33 Communication apparatuses
H1-H2 Server
R1 Router

BEST MODE FOR CARRYING OUT THE INVENTION

In the following, the prototype embodying the best mode of the present invention is described with reference to diagrams. However, the present invention is not limited to this prototype.

1. Execution Example 1

Figure 1:
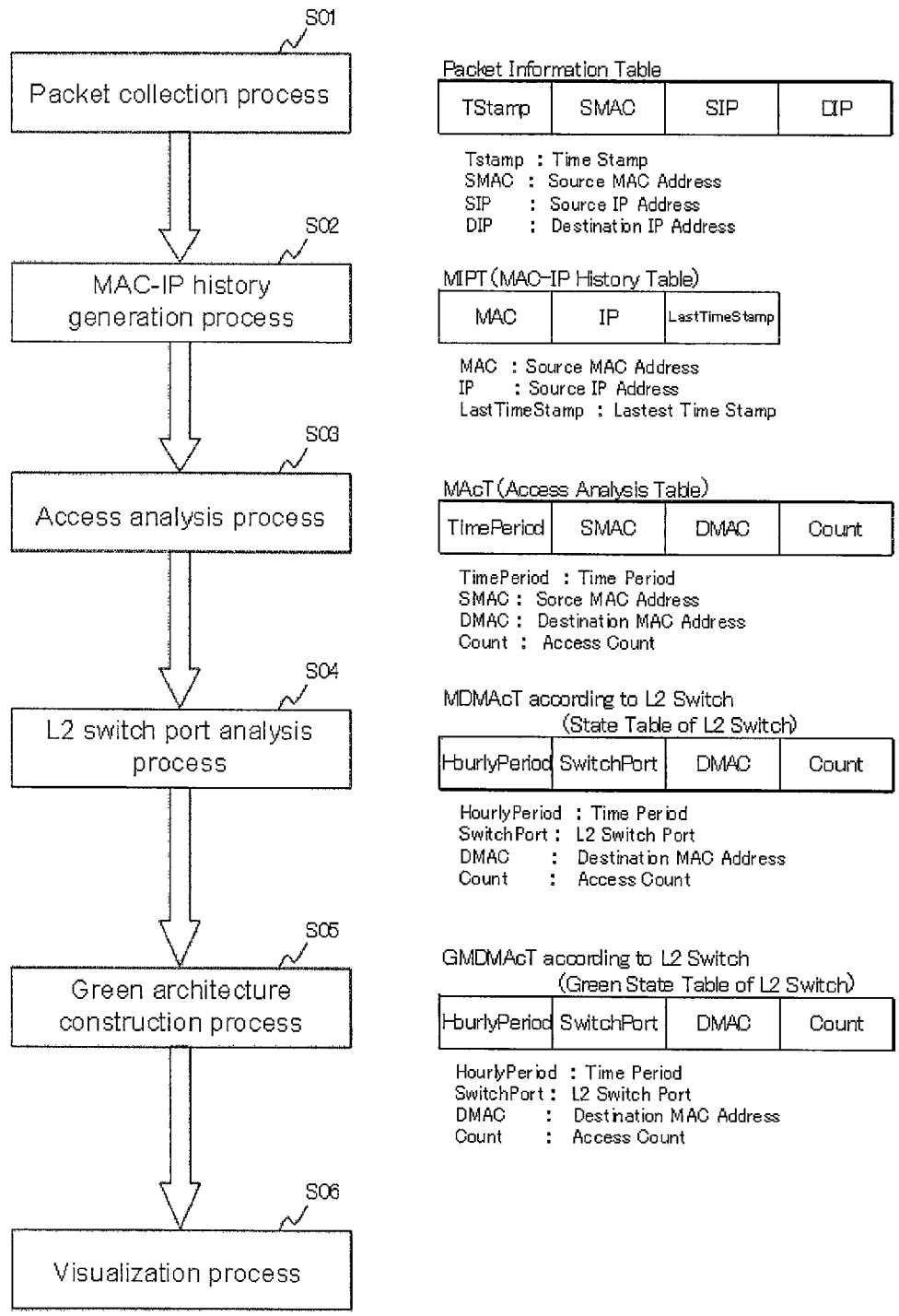
FIG. 1 shows an example of flowchart describing a method for constructing a green network for carrying out "Execution Example 1" of the present invention.

The method for carrying out "Execution Example 1" of the present invention is concretely explained with reference to the flowchart shown in FIG. 1. FIG. 1 shows an example of the flowchart of the present invention, proposing the method for constructing a green architecture for achieving efficient power saving in the arbitrary network comprising of L2 switches.

As shown in FIG. 1, the packet collection process S01 collects all broadcast packets transmitted within the network including L2 switches and extracts packet information {Time Stamp (TStamp), Source MAC Address (SMAC), Source IP Address (SIP), Destination IP Address (DIP)} from the broadcast packets. Additionally, the broadcast packets transmitted within the network include ARP packets in Ipv4 protocol.

Next, the MAC-IP history generation process S02 generates a MAC-IP history table (MIPT) with entries {MAC Address(MAC), IP Address(IP), Latest Timestamp(LastTimeStamp)} based on the packet information {TStamp, SMAC, SIP} extracted by the packet collection process S01. More specifically, the MAC-IP history generation process S02 generates the MIPT with entries {MAC, IP, LastTimeStamp} based on the packet information {TStamp, SMAC, SIP} extracted from the broadcast packets transmitted within the network including L2 switches and overwrites the entry {LastTimeStamp} of the MIPT with latest Timestamp information of the packet information {TStamp} in case the entries {MAC, IP} of the MIPT are the same as packet information {SMAC, SIP}.

Next, the access analysis process S03 generates an access history table (MAcT) with entries {Time Period (TimePeriod), Source MAC Address (SMAC), Destination MAC Address (DMAC), Access Count (Count)}, by classifying packets into categories{Source MAC Address(SMAC), Destination MAC Address(DMAC)} based on MIPT generated by the MAC-IP history generation process S02 and counting the number of packets classified into the categories within the predetermined time slot at regular intervals based on the packet information {TStamp, SMAC, SIP, DIP} extracted by the packet collection process S01. Additionally, the entry DMAC of the MAcT is determined based on the packet information {DIP} extracted by the packet collection process S01 with reference to the MIPT.

With reference to the MAcT, it is possible to monitor the history of communication with apparatuses within predetermined periods. For instance, it is possible to detect apparatuses between which communication is carried out, and to detect the frequency as well as the period of communication.

Additionally, Time Period (TimePeriod) as an entry of MAcT is enabled to be configured appropriately to suit the network environment.

Next, the L2 switch port analysis process S04 generates a L2 switch state table (MDMAcT) with entries {Period (HourlyPeriod), L2 switch port (port), Destination MAC Address (DMAC), Access Count (Count)} for every L2 switch, by detecting apparatuses connected to the port of L2 switches and analyzing access counts of the apparatuses within predetermined period based on the MAcT generated by the access analysis process S03.

Additionally, as a method for detecting apparatuses connected to the port of L2 switches, the method disclosed in Japanese Patent No. 4653164 can be used. Meanwhile, the patent owner and inventor of the above patent is the same as that for the present application.

With reference to the MDMAcT generated for every L2 switch, it is possible to detect communication state of every port of L2 switch and frequency of communication with apparatuses (DMAC) connected to L2 switch ports within predetermined period (HourlyPeriod). Additionally, period (HourlyPeriod) as the entry of the MDMAcT is enabled to be configured appropriately to suit the network environment.

Next, the green architecture construction process S05 generates a green L2 switch state table (GMDMAcT) in which L2 switch port configuration of the MDMAcT has been updated, upon detecting a specific L2 switch in which the L2 switch port is in access state (1=<Count) based on the MDMAcT, deleting the entry DMAC of the L2 switch port of the L2 switch detected above from the MDMAcT, and adding the entry DMAC to the MDMAcT of the other L2 switch.

Additionally, FIG. 5 shows an example of the algorism executed for generating the green L2 switch state table (GMDMAcT). As shown in FIG. 5, the algorism executes the steps of:

(1) Detecting a L2 switch including the least number of the L2 switch port that is in access state (1=<Count) from L2 switches in which the L2 switch port is in access state (1=<Count) based on the MDMAcT;

(2) Deleting the entry DMAC of the port of the L2 switch detected above from the MDMAcT, and adding the entry DMAC to the empty entry of the MDMAcT of other L2 switch;

(3) Generating the GMDMAcT in which L2 switch port configuration of the MDMAcT has been updated upon executing the above steps (1) and (2) repeatedly.

Next, the visualization process S06 displays information about the GMDMAcT in which L2 switch port configuration of the MDMAcT has been updated. Therefore, it is possible for the network administrator to carry out alterations of L2 switch port configuration dynamically with reference to the GMDMAcT.

More specifically, it is possible to stop power-supply of the L2 switches for the period when the L2 switches are not in use (Count=0). Herewith, it is possible to achieve efficient power saving by cutting ineffectual power.

Figure 2:
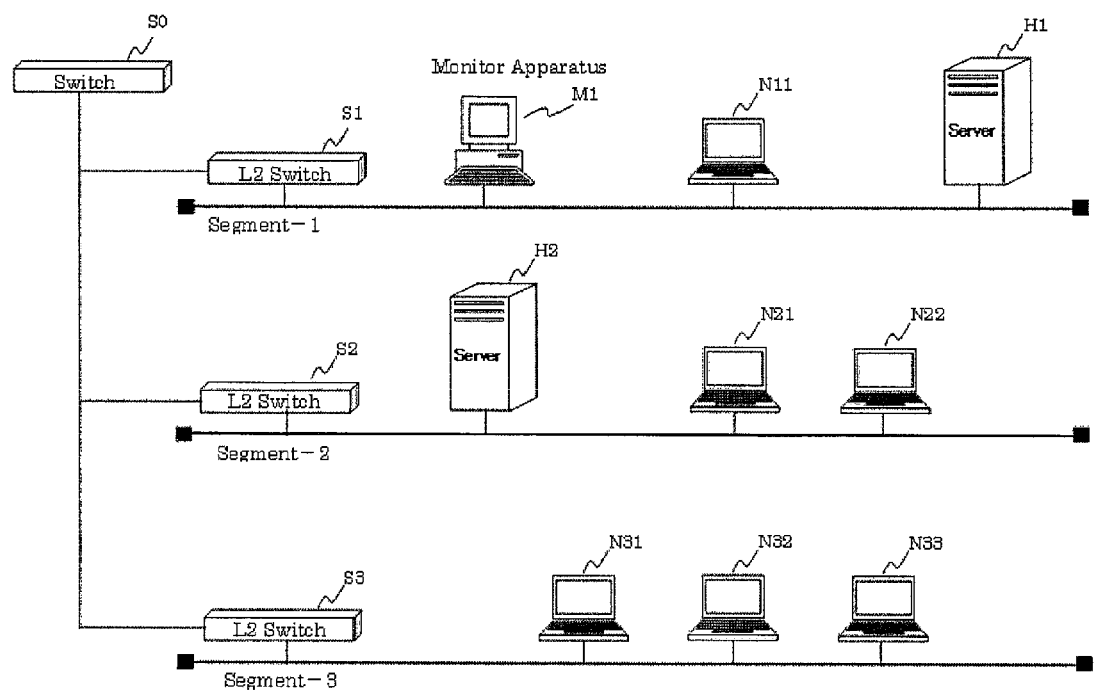
FIG. 2 shows an example of network configuration for carrying out "Execution Example 1" of the present invention.
Figure 3:
FIG. 3 shows an example of tables generated based on packet information for carrying out "Execution Example 1" of the present invention.
Figure 3:
Figure 3:
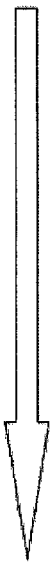

Next, the embodiment for carrying out the above method of the present invention is concretely explained with reference to the network configuration shown in FIG. 2 and tables shown in FIG. 3-4. Additionally, FIGS. 2-4 are examples of the embodiment.

The packet collection process S01 collects all broadcast packets transmitted within the network including L2 switches (FIG. 2) and extracts packet information{TimeStamp (TStamp), Source MAC Address (SMAC), Source IP Address (SIP), Destination IP Address (DIP)} (FIG. 3) from the broadcast packets. As shown in FIG. 3, the packet information table is extracted within the period (10:00:00-10:09:10). For instance, the packet information table shows that apparatus N31 transmits broadcast packets to server H1 at the time (10:00:00).

Next, the MAC-IP history generation process S02 generates a MAC-IP history table (MIPT) with entries {MAC Address(MAC), IP Address(IP), Latest Timestamp(LastTimeStamp)} based on the packet information {TStamp, SMAC, SIP} extracted by the packet collection process S01.

Meanwhile, the example for generation of the MIPT is explained below with reference to FIG. 3.

(a) The entry {MAC-N31, IP-N31, 10:00:00} of the MIPT is generated based on the packet information table {TStamp=10:00:00, SMAC=MAC-N31, SIP=IP-N31}.

(b) The entry {MAC-H1, IP-H1, 10:09:10} of the MIPT is generated based on the packet information table {TStamp=10:09:10, SMAC=MAC-H1, SIP=IP-H1} shown as Latest Time Stamp.

(c) The entry {MAC-N22, IP-N22, 10:01:30} of the MIPT is generated based on the packet information table {TStamp=10:01:30, SMAC=MAC-N22, SIP=IP-N22}.

(d) The entry {MAC-H2, IP-H2, 10:04:50} of the MIPT is generated based on the packet information table {TStamp=10:04:50, SMAC=MAC-H2, SIP=IP-H2} shown as Latest Time Stamp.

(e) The entry {MAC-N31, IP-N31-1, 10:06:00} of the MIPT is generated based on the packet information table {TStamp=10:06:00, SMAC=MAC-N31, SIP=IP-N31-1}.

Meanwhile, the entry LastTimeStamp of (a) is not overwritten because IP address of N31 has been changed to IP-N31-1 from IP-N31.

(f) The entry {MAC-N11, IP-N11, 10:04:40} of the MIPT is generated based on the packet information table {TStamp=10:04:40, SMAC=MAC-N11, SIP=IP-N11}.

(g) The entry {MAC-N31, IP-N31, 10:09:00} of the MIPT is generated based on the packet information table {TStamp=10:09:00, SMAC=MAC-N31, SIP=IP-N31}. Meanwhile, the entry LastTimeStamp of (a) is not overwritten because IP address of N31 has been changed to IP-N31 from IP-N31-1 after changing IP address of N31 to IP-N31-1 from IP-N31.

Next, the access analysis process S03 generates an access history table (MAcT) with entries {Time Period (TimePeriod), Source MAC Address (SMAC), Destination MAC Address (DMAC), Access Count (Count)}, by classifying packets into categories{Source MAC Address(SMAC), Destination MAC Address(DMAC)} based on MIPT generated by the MAC-IP history generation process S02 and counting the number of packets classified into the categories within the predetermined time slot at regular intervals based on the packet information {TStamp, SMAC, SIP, DIP} extracted by the packet collection process S01. Additionally, the entry DMAC of the MAcT is determined based on the packet information {DIP} extracted by the packet collection process S01 with reference to the MIPT.

As shown in FIG. 3, the example for generation the MAcT is explained below. The entry {Count} of the MAcT is determined by counting the frequency of communication with apparatuses based on the MIPT and the packet information table.

(a) The entry {SMAC=MAC-N31, DMAC=MAC-H1, Count=8} of the MAcT is generated within period (10:00: 00-10:09:59).

(b) The entry {SMAC=MAC-N22, DMAC=MAC-H2, Count=2} of the MAcT is generated within period (10:00: 00-10:09:59).

(c) The entry {SMAC=MAC-N11, DMAC=MAC-H2, Count=2} of the MAcT is generated within period (10:00: 00-10:09:59).

Next, the L2 switch port analysis process S04 generates a L2 switch state table (MDMAcT) with entries {Period (HourlyPeriod), L2 switch port (port), Destination MAC Address (DMAC), Access Count (Count)} for every L2 switch, by detecting apparatuses connected to the port of L2 switches and analyzing access counts of the apparatuses within predetermined period based on the MAcT generated by the access analysis process S03.

FIG. 4 shows the MDMAcT for the L2 switch S3 and the MDMAcT for the L2 switch S2. As shown in FIG. 4, the access count of the port 4 of the L2 switch S3 is six, and the access count of other ports of the L2 switch S3 is zero within the period (21:00:00-21:59:59).

Next, the green architecture construction process S05 generates a green L2 switch state table (GMDMAcT) in which L2 switch port configuration of the MDMAcT has been updated, upon detecting a specific L2 switch in which the L2 switch port is in access state (1=<Count) based on the MDMAcT, deleting the entry DMAC of the L2 switch port of the L2 switch detected above from the MDMAcT, and adding the entry DMAC to the MDMAcT of other L2 switch. Additionally, FIG. 5 shows an example of algorithm executed for generating the green L2 switch state table (GMDMAcT).

FIG. 4 shows the GMDMAcT for the L2 switch S3 and the GMDMAcT for the L2 switch S2. As shown in FIG. 4, the example for generation of the GMDMAcT is explained below.

(a) Detecting the L2 switch including the least number of the L2 switch port that is in access state (1=<Count) based on the MDMAcT. Herewith, the L2 switch S3 is detected.

(b) Deleting the entry DMAC of the port of the L2 switch detected above from the MDMAcT, and adding the entry DMAC to the empty entry of the MDMAcT of other L2 switch. Herewith, the entry DMAC of the port 4 of the L2 switch S3 is deleted, and the entry DMAC is added to the port 1 of the L2 switch S2.

(3) Generating the GMDMAcT in which L2 switch port configuration of the MDMAcT has been updated upon executing the above steps (1) and (2) repeatedly. Herewith, the GMDMAcT of the L2 switch S3 is generated by setting DMAC=nil in the port 4, and the GMDMAcT of the L2 switch S2 is generated by setting DMAC=MAC-N33 in the port 1.

Next, the visualization process S06 displays information about the GMDMAcT in which L2 switch port configuration of the MDMAcT has been updated. Herewith, as shown in FIG. 4, the information about the GMDMAcT for L2 switch L3 and L2 is displayed. Therefore, it is possible for the network administrator to carry out altering L2 switch port configuration dynamically with reference to the GMDMAcT. Herewith, the network administrator is able to detach the apparatus N33 from the port 4 of the L2 switch S3, and add the apparatus N33 to the empty port 1 of the L2 switch S2 with reference to the GMDMAcT.

More specifically, it is possible to stop power-supply of the L2 switch S3 in the period when the L2 switches have not been in use (Count=0) with reference to the GMDMAcT. Herewith, as shown in FIG. 4, it is possible to stop power-supply of the L2 switch S3 in the time zone (21:00:00-21:59:59). Therefore, it is possible to achieve efficient power saving by cutting ineffectual power.

The embodiment above mentioned with reference to the FIG. 2-4 has been explained in the time zone (21:00:00-21:59:59), and it is possible to achieve efficient power saving in other time zones similarly.

2. Execution Example 2

The method for carrying out "Execution Example 2" of the present invention is concretely explained. The process S01-S05 of the Execution Example 2 is the same as the process S01-S05 of the Execution Example 1. Then, the visualization process S06 is explained below.

The visualization process S06 analyzes communication time between specific apparatuses based on the MAcT, and displays information about the L2 switch to which the apparatuses are connected in case the communication time has been beyond the predetermined threshold. Therefore, the visualization process S06 detects the communication with the apparatuses over prolonged period of time with reference to information about the different L2 switches to which the apparatuses are connected in case the communication time has been beyond the predetermined threshold and displays information about the different L2 switches.

Additionally, as a method for detecting apparatuses connected to the port of L2 switches, the method disclosed in Japanese Patent No. 4653164 can be used. Meanwhile, the patent owner and inventor of the above patent is the same as that of the present application.

Therefore, the network administrator can recognize communication with the apparatuses over prolonged period upon seeing the information about the different L2 switches displayed by the visualization process S06. For instance, the network administrator can alter L2 switch port configuration dynamically by connecting the apparatuses connected to different L2 switches to the same L2 switch for reducing communication load in the network.

Next, the embodiment for carrying out the above is concretely explained with reference to tables shown in FIG. 3. Additionally, FIG. 3 gives examples for explaining the embodiment. With reference to {SMAC=MAC-N31, DMAC=MAC-H1, Count=8} of the MAcT, it is apparent that the frequency of communication with the apparatus N31 and the server H1 is 8 in the time zone (10:00:00-10:09:59). For instance, in case communication with the apparatus N31 and the server H1 is continued in the time zone (10:10:00-10:19:59) after the time zone (10:00:00-10:09:59) and the predetermined threshold is configured with the value "20 minutes", it is carried out to detect communication with the apparatus N31 and the server H1 and display information about the L2 switch S3 (to which the apparatus N31 is connected) and the L2 switch S1 (to which the server H1 is connected).

Therefore, upon seeing the above-mentioned information, the network administrator can detach the apparatus N31 dynamically from the L2 switch S3, and add the apparatus N31 to the L2 switch S1. Herewith, it is carried out to reduce communication load in the network, and achieve efficient power saving in the network as a whole.

INDUSTRIAL APPLICABILITY

This invention is able to apply technology for constructing a green architecture for achieving efficient power saving in an arbitrary network comprising of L2 switches.

What is claimed is:

1. A method for displaying information to a network administrator for altering configuration of the network for achieving efficient power saving in an arbitrary network comprising of L2 switches, said method comprising:

a packet collection process for collecting all broadcast packets transmitted within the network and extracting packet information {Time Stamp(TStamp), Source MAC Address(SMAC), Source IP Address(SIP), Destination IP Address(DIP)} from the broadcast packets;

a MAC-IP history generation process for generating a MAC-IP history table (MIPT) with entries {MAC Address(MAC), IP Address(IP), Latest Timestamp (LastTimeStamp)} based on the packet information {TStamp, SMAC, SIP, DIP} extracted by the packet collection process;

an access analysis process for generating an access history table (MAcT) with entries {Time Period (TimePeriod), Source MAC Address (SMAC), Destination MAC Address (DMAC), Access Count (Count)}, by classifying packets into categories {Source MAC Address (SMAC), Destination MAC Address(DMAC)} based on MIPT generated by the MAC-IP history generation process and counting number of packets classified into the above categories within a prespecified time slot at regular intervals based on the packet information {TStamp, SMAC, SIP, DIP} extracted by the packet collection process;

a L2 switch port analysis process for generating a L2 switch state table (MDMAcT) with entries {Period (HourlyPeriod), L2 switch port (port), Destination MAC Address (DMAC), Access Count (Count)} for every L2 switch, by detecting apparatuses connected to the port of L2 switches and analyzing access counts of the apparatuses within predetermined period based on the MAcT generated by the access analysis process;

a green architecture construction process for generating a green L2 switch state table (GMDMAcT) in which L2 switch port configuration of the MDMAcT has been updated, upon detecting a specific L2 switch in which the L2 switch port is in access state (1=<Count) based on the MDMAcT, deleting the entry DMAC of the L2 switch port of the L2 switch detected above from the MDMAcT, and adding the entry DMAC to the MDMAcT of other L2 switch; and a visualization process for displaying information to a network administrator for altering configuration of the network based on the GMDMAcT generated by the green architecture construction process.

2. The method according to claim 1, wherein the green architecture construction process comprises the steps of:

(1) Detecting a L2 switch having smallest number of L2 switch ports that are in access state (1=<Count) from among L2 switches in which one or more L2 switch ports are in access state (1=<Count) based on the MDMAcT;

(2) Deleting the entry DMAC of the port of the L2 switch detected above from the MDMAcT, and adding the entry DMAC to an empty entry of the MDMAcT of another L2 switch; and (3) Generating the GMDMAcT in which L2 switch port configuration of the MDMAcT has been updated upon executing the above steps (1) and (2) repeatedly.

3. The method according to claim 1, wherein the visualization process further comprises displaying information about the GMDMAcT in which L2 switch port configuration of the MDMAcT has been updated.

4. The method according to claim 3, wherein the visualization process further comprises:

analyzing access time between specific apparatuses based on the MAcT, and displaying information about the L2 switch to which the apparatuses are connected in case the access time has been beyond a prespecified threshold.

5. The method according to claim 2, wherein the visualization process further comprises displaying information about the GMDMAcT in which L2 switch port configuration of the MDMAcT has been updated.

* * * * *